US012715989B2

(12) United States Patent
Kim et al.

(10) Patent No.: US 12,715,989 B2
(45) Date of Patent: Aug. 25, 2026

(54) ANTIGLARE FILM LAMINATE, POLARIZING PLATE, AND DISPLAY DEVICE

(71) Applicant: LG CHEM, LTD., Seoul (KR)

(72) Inventors: Min Soo Kim, Daejeon (KR); Jung Hyun Seo, Daejeon (KR); Hanna Lee, Daejeon (KR); Yeongrae Chang, Daejeon (KR)

(73) Assignee: XINMEI FONTANA HOLDING (HONG KONG) LIMITED, Hong Kong (CN)

( * ) Notice: Subject to any disclaimer, the term of this patent is extended or adjusted under 35 U.S.C. 154(b) by 180 days.

(21) Appl. No.: 17/912,412

(22) PCT Filed: Oct. 12, 2021

(86) PCT No.: PCT/KR2021/013986

§ 371 (c)(1),
(2) Date: Sep. 16, 2022

(87) PCT Pub. No.: WO2022/080801

PCT Pub. Date: Apr. 21, 2022

(65) Prior Publication Data

US 2023/0117581 A1 Apr. 20, 2023

(30) Foreign Application Priority Data

Oct. 12, 2020 (KR) ........................ 10-2020-0131022
Oct. 12, 2021 (KR) ........................ 10-2021-0134760

(51) Int. Cl.
*C08L 33/08* (2006.01)
*C08J 7/04* (2020.01)
(Continued)

(52) U.S. Cl.
CPC ............ *C08L 33/08* (2013.01); *C08J 7/0427* (2020.01); *C08K 3/36* (2013.01); *C09D 7/61* (2018.01);
(Continued)

(58) Field of Classification Search
CPC .... C08L 33/08; C08L 2205/035; C08L 83/04; C08J 7/0427; C08J 2333/08;
(Continued)

(56) References Cited

U.S. PATENT DOCUMENTS 8,047,662 B2 11/2011 Suzuki et al.
8,582,207 B2 11/2013 Fukuda et al.
(Continued)

FOREIGN PATENT DOCUMENTS

JP 2001-272510 A 10/2001
JP 2002-202402 A 7/2002
(Continued)

OTHER PUBLICATIONS

International Search Report dated Jan. 27, 2022, issued in the corresponding International Application No. PCT/KR2021/013986, 4 pages.

*Primary Examiner* — Megha M Gaitonde
(74) *Attorney, Agent, or Firm* — Ricky Lam

(57) ABSTRACT

The present invention relates to an antiglare film laminate including a polymer substrate, and an antiglare layer containing a binder resin and organic fine particles or inorganic fine particles dispersed on the binder resin, wherein the number of pressed portions formed on an outer surface of the antiglare layer is 0.001 pieces/m$^2$ or less, and the pressed portion has a diameter of 200 μm to 600 μm and a thickness of 80% or less of an average thickness of the antiglare layer, a polarizing plate including the antiglare film laminate, and a display device including the polarizing plate.

8 Claims, 3 Drawing Sheets

(51) Int. Cl.

| | |
|---|---|
| ***C08K 3/36*** | (2006.01) |
| ***C09D 7/61*** | (2018.01) |
| ***C09D 7/65*** | (2018.01) |

(52) U.S. Cl.
CPC ............ *C09D 7/65* (2018.01); *C08J 2333/08* (2013.01); *C08J 2483/04* (2013.01); *C08K 2201/003* (2013.01); *C08L 2205/035* (2013.01)

(58) Field of Classification Search
CPC ................ C08J 2483/04; C08J 2367/02; C08J 2433/08; C08K 3/36; C08K 3/22; C08K 2201/003; C08K 2201/011; C08K 5/1515; C09D 7/61; C09D 7/65; C09D 7/67; C09D 7/68; C09D 7/69; C09D 5/006; G02B 5/30; Y10T 428/24479; Y10T 428/24612; Y10T 428/24802; Y10T 428/24893; Y10T 428/24942; Y10T 428/2495
USPC ............ 428/156, 172, 195.1, 206, 212, 213
See application file for complete search history.

(56) References Cited

U.S. PATENT DOCUMENTS

| | | | |
|---|---|---|---|
| 2002/0085284 | A1 | 7/2002 | Nakamura et al. |
| 2020/0400860 | A1 | 12/2020 | Seo et al. |

FOREIGN PATENT DOCUMENTS

| | | | |
|---|---|---|---|
| JP | 2006-337664 | A | 12/2006 |
| JP | 2007-070395 | A | 3/2007 |
| JP | 2007-322779 | A | 12/2007 |
| JP | 2008-268939 | A | 11/2008 |
| JP | 2010-072540 | A | 4/2010 |
| JP | 2010-254950 | A | 11/2010 |
| JP | 2011-075939 | A | 4/2011 |
| JP | 2011-075940 | A | 4/2011 |
| JP | 2013-200488 | A | 10/2013 |
| JP | 2016-071085 | A | 5/2016 |
| KR | 10-2014-0006922 | A | 1/2014 |
| KR | 10-2019-0129553 | A | 11/2019 |
| KR | 10-2020-0067586 | A | 6/2020 |

【FIG. 1】
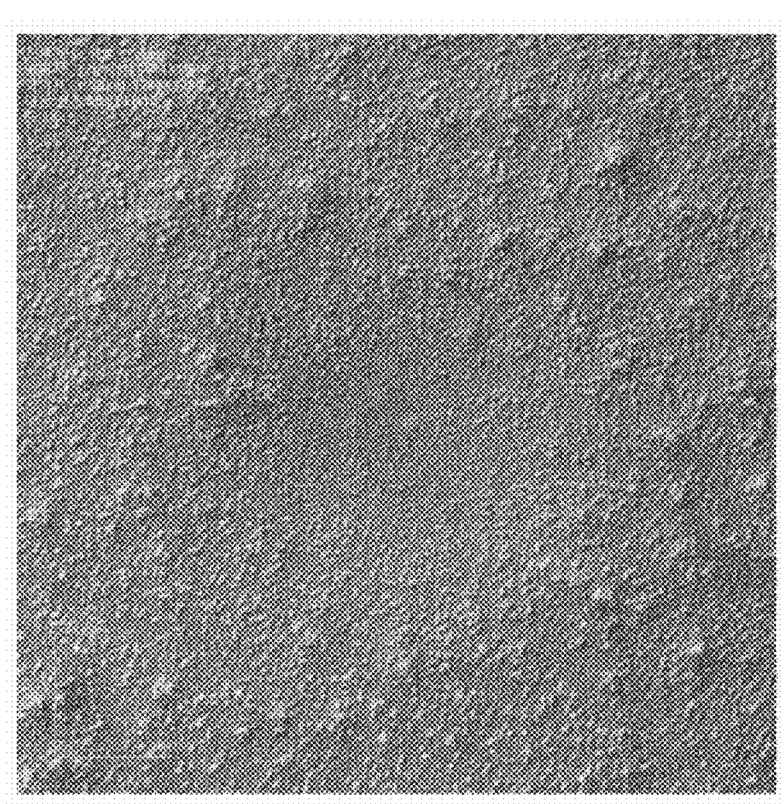

【FIG. 2】
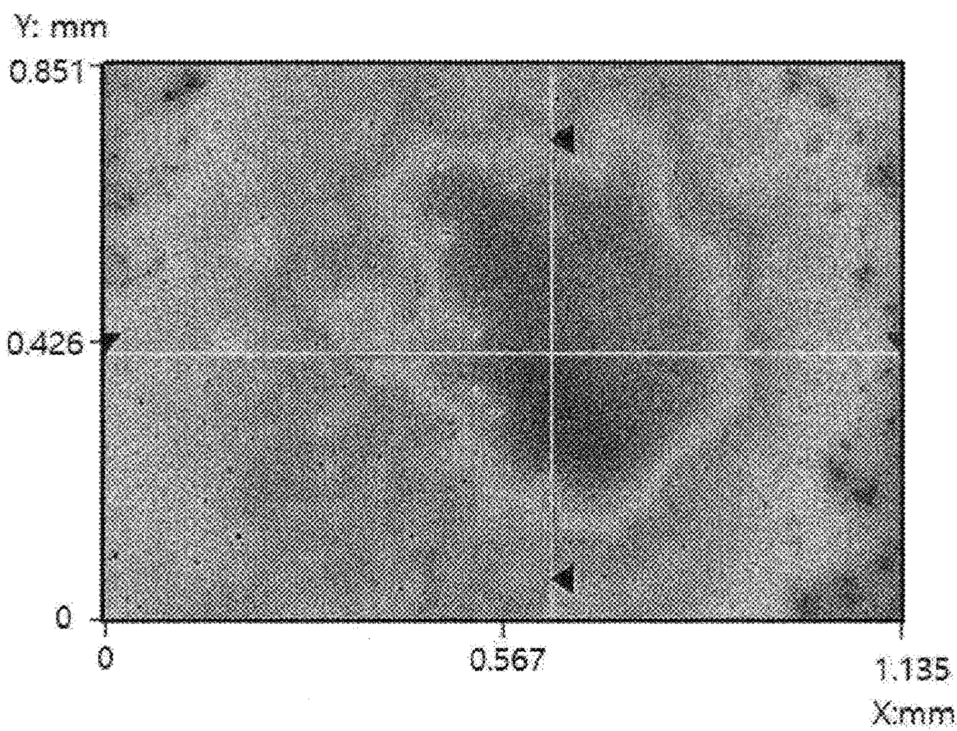

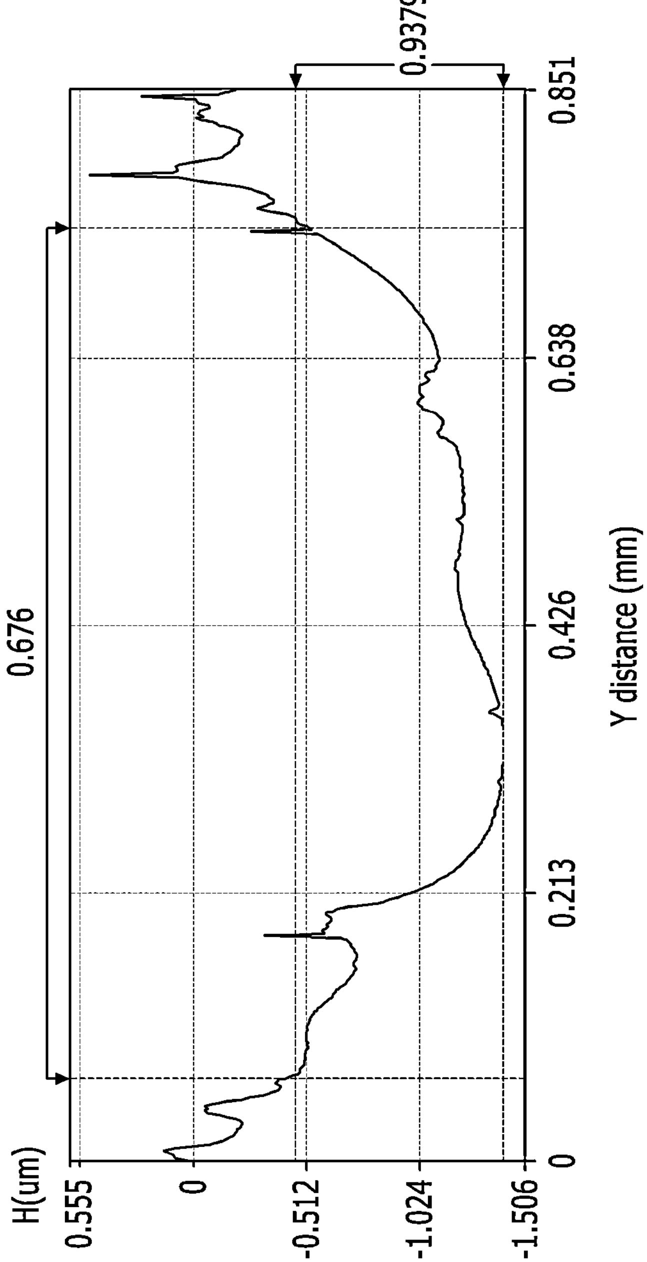
【FIG. 3】

ANTIGLARE FILM LAMINATE, POLARIZING PLATE, AND DISPLAY DEVICE

CROSS-REFERENCE TO RELATED APPLICATION(S)

This application is a 35 U.S.C. 371 National Phase Entry application from PCT/KR2021/013986 filed on Oct. 12, 2021, which claims the benefit of Korean Patent Application No. 10-2020-0131022 filed on Oct. 12, 2020, and Korean Patent Application No. 10-2021-0134760 filed on Oct. 12, 2021 with the Korean Intellectual Property Office, the disclosures of which are incorporated herein by reference in their entirety.

FIELD OF THE INVENTION

The present invention relates to an antiglare film laminate, a polarizing plate, and a display device.

BACKGROUND OF THE INVENTION

In an image display device such as an organic light emitting display (OLED) or a liquid crystal display (LCD), it is required to prevent deterioration of contrast or deterioration of visibility due to reflection of external light or reflection of an image. To this end, an optical laminated film such as an anti-reflection film is formed on a surface of an image display device in order to reduce reflection and the like of an image by utilizing light scattering, optical interference, or the like.

For example, in a liquid crystal display and the like, an optical laminated film including an antiglare layer has been generally formed. This antiglare layer mainly includes a binder and fine particles contained in the binder, and some of these fine particles usually protrude from a surface of the binder to form protrusions and depressions. In other words, since the antiglare layer has the surface protrusions and depressions due to the fine particles protruding from the surface of the binder, it is possible to control light scattering, light reflection, and the like, to suppress deterioration of visibility of the image display device.

In the case of an optical film including a previously known antiglare layer, organic nanoparticles and inorganic nanoparticles were used together to form protrusions and depressions on the surface, but there was a problem in that the inorganic nanoparticles might aggregate or the organic particles and the inorganic particles might be non-uniformly dispersed.

Accordingly, despite the use of organic particles and inorganic particles, the optical characteristics of the antiglare layer are deteriorated, so that the antiglare characteristics that control light scattering, light reflection, and the like are not properly realized, and due to a lower coating thickness compared to the existing coating layer, the reflection of light is reduced compared to the surrounding area, which may cause a press defect recognized as a black dot, so improvement is required.

BRIEF SUMMARY OF THE INVENTION

The present invention has been made in an effort to provide an antiglare film laminate having advantages of implementing a high contrast ratio and excellent image sharpness and having mechanical properties such as high wear resistance and scratch resistance.

Further, the present invention has been made in an effort to provide a polarizing plate having advantages of implementing a high contrast ratio and excellent image sharpness and having mechanical properties such as high wear resistance and scratch resistance.

Furthermore, the present invention has been made in an effort to provide a liquid crystal panel and a display device including the antiglare film laminate.

In the present specification, an exemplary embodiment of the present invention provides an antiglare film laminate polymer that includes a polymer substrate; and an antiglare layer containing a binder resin and organic fine particles or inorganic fine particles dispersed on the binder resin, wherein the number of pressed portions formed on an outer surface of the antiglare layer is 0.001 pieces/m$^2$ or less, and the pressed portion has a diameter of 200 μm to 600 μm and a thickness of 80% or less of an average thickness of the antiglare layer.

Further, in the present specification, another embodiment of the present invention provides a polarizing plate including the antiglare film laminate.

Further, in the present specification, yet another embodiment of the present invention provides a display device including the polarizing plate.

DETAILED DESCRIPTION OF THE INVENTION

Hereinafter, an antiglare film laminate, a polarizing plate, and a display device according to a specific embodiment of the present invention will be described in more detail.

In the present specification, terms such as first and second may be used to describe various components, and the terms are used only to discriminate one component from another component.

In addition, a (meth)acryl is meant to include both acryl and methacryl.

Further, nano-inorganic fine particles having a hollow structure refer to particles in a form in which an empty space exists on the surface of and/or inside the nano-inorganic fine particles.

Further, a (co)polymer is meant to include both a co-polymer and a homo-polymer.

An embodiment of the present invention provides an antiglare film laminate polymer including: a polymer substrate; and an antiglare layer containing a binder resin and organic fine particles or inorganic fine particles dispersed on the binder resin, wherein the number of pressed portions formed on an outer surface of the antiglare layer is 0.001 pieces/m$^2$ or less, and the pressed portion has a diameter of 200 μm to 600 μm and a thickness of 80% or less of an average thickness of the antiglare layer.

The present inventors have manufactured an antiglare film laminate in which, by controlling dispersion and distribution of organic and/or inorganic fine particles included in an antiglare layer, pressed portions having a diameter of 200 μm to 600 μm and a thickness of 80% or less of an average thickness of the antiglare layer exist at 0.001 pieces/m$^2$ or less on an outer surface of the antiglare layer.

As the pressed portions having a diameter of 200 μm to 600 μm and a thickness of 80% or less of an average thickness of the antiglare layer exist at 0.001 pieces/m$^2$ or less on the outer surface of the antiglare layer in the antiglare film laminate, the antiglare film laminate may realize a high contrast ratio and uniform and good image sharpness while having a relatively low haze value.

The antiglare layer and/or the polarizing plate may have a transmittance of 90% or more, and a haze of 1.5% or less, or 1.2% or less under an 'A' light source (measuring instrument: HM-150, measurement standard: JIS K 7105).

The characteristics of the antiglare layer described above may be due to specifying the content of solids excluding the solvent in the coating composition for forming the antiglare layer, the type of organic solvent used when the antiglare layer is formed, or the like.

More specifically, the content of solids excluding the solvent in the coating composition for forming the antiglare layer may be 25 to 40% by weight or 30 to 35% by weight. As the content of solids of the coating composition for forming the antiglare layer is adjusted in the above-described range, flow of the organic fine particles or inorganic fine particles may be smooth during the formation of the antiglare layer. Accordingly, it is possible to prevent the phenomenon of the above-described pressed portions appearing due to occurrence of a large number of aggregations of the particles.

In addition, the coating composition for forming the antiglare layer may include a specific mixed solvent. The organic solvent may include alcohol and non-alcohol organic solvents, and more specifically, the organic solvent may include n-butyl acetate, alcohol such as n-butanol, and ketone solvent such as methylisobutyl ketone.

The organic solvent may include the n-butyl acetate and the ketone solvent such as methylisobutyl ketone in a weight ratio of 1:1.2 to 1:7, or 1:1.3 to 1:5.

In addition, the organic solvent may include the n-butyl acetate and the alcohol such as n-butanol in a weight ratio of 1:0.5 to 1:3, or 1:1 to 1:2.

By using the above-mentioned organic solvent, the flow of organic fine particles or inorganic fine particles may be smooth during the formation of the antiglare layer, and accordingly, the pressed portion, which appears as the organic or inorganic fine particles are not distributed, may not be substantially formed.

In addition, a frequency at which or whether the pressed portion having a diameter of 200 μm to 600 μm and having a thickness of 80% or less of the average thickness of the antiglare layer is formed on the outer surface of the antiglare layer, may depend on a component of the binder resin included in the antiglare layer and on the flow or distribution of the organic or inorganic fine particles.

Meanwhile, the binder resin included in the antiglare layer may include a light-curable resin. A specific example of the photopolymerizable compound may include a (co)polymer formed from a vinyl-based monomer or oligomer or a (meth)acrylate monomer or oligomer.

In addition, the antiglare layer may further include a silicon-based additive and a fluorine-based additive.

Depending on a distribution pattern of the silicon-based additive and the fluorine-based additive, whether the pressed portion having a diameter of 200 μm to 600 μm and a thickness of 80% or less of the average thickness of the antiglare layer is formed or the ratio at which the pressed portion is formed on the outer surface of the antiglare layer may be different.

More specifically, when the ratio of the presence of the silicon-based additive and the fluorine-based additive around the organic or inorganic fine particles in the antiglare layer is low, the compatibility between the components included in the antiglare layer may be deteriorated, or the organic or inorganic fine particles are difficult to sufficiently aggregate or be positioned within an appropriate distance due to lack of leveling property due to rapid volatilization of the solvent, so that the frequency or the number per unit area of the above-described pressed portions formed on the outer surface of the antiglare layer may greatly increase.

In the antiglare layer, there is a high possibility that the pressed portion occurs in a region in which the silicon-based additive and/or the fluorine-based additive do not sufficiently exist, and accordingly, in the pressed portion, an element weight ratio of fluorine contained in the fluorine-based additive to carbon contained in the (co)polymer formed from the vinyl-based monomer or oligomer or the (meth)acrylate monomer or oligomer may be significantly lowered.

More specifically, a weight ratio between fluorine (F)/carbon (C) elements in the pressed portion may be 3.0% or 2.5% or less.

Although the weight ratio between the fluorine (F)/carbon (C) elements or a weight ratio between silicon (Si)/carbon (C) elements on the surface of the antiglare layer is not particularly limited, as described above, as the antiglare layer further includes the silicon-based additive and the fluorine-based additive, the weight ratio between the fluorine (F)/carbon (C) elements may be 10% or more on the surface of the antiglare layer excluding the pressed portion, and the weight ratio between the silicon (Si)/carbon (C) elements may be 5 to 15% on the surface of the antiglare layer excluding the pressed portion.

In addition, on the surface of the antiglare layer, a weight ratio between a total of the fluorine (F) and silicon (S) elements/carbon (C) element may be 15 to 40%, or 20 to 35%.

Meanwhile, the content of the silicon-based additive and/or the fluorine-based additive included in the antiglare layer is not particularly limited, but in order not to significantly increase the frequency at which the above-described pressed portions appear or the number per unit area, they may be required to be included in a predetermined content or more.

For example, the antiglare layer may include 0.3 parts by weight or more, or 0.4 parts by weight or more, or 0.3 to 2 parts by weight of the fluorine-based additive based on 100 parts by weight of the binder resin.

In addition, the antiglare layer may include 0.25 parts by weight or more, or 0.26 parts by weight or more, or 0.25 to 2 parts by weight of the silicon-based additive based on 100 parts by weight of the binder resin.

Examples of the silicon-based additive include polyether-modified polysiloxane copolymer, or more specifically, polyether-modified hydroxy-functional polysiloxane.

The polyether-modified hydroxy-functional polysiloxane may include, for example, a linear or branched polysiloxane modified by one or more polyether groups bonded through a silicon-carbon bond or a silicon-oxygen-carbon bond. Examples of the polyether include a polyethylene oxide, a polypropylene oxide, and a combination thereof. Examples of the polyether modified hydroxy functional polysiloxane include those commercially available from Evonik under the product name TEGO® Glide 440 polyether-modified polysiloxane, TEGO® Glide 410 polyether-modified polysiloxane, and TEGO® Glide 425 polyether-modified polysiloxane, among others, but are not limited thereto.

In addition, examples of the fluorine-based additive may include a fluorine-based copolymer or a copolymer of a fluorine-based and silicon-based mixture, and examples of such commercial products include F444, RS-907, RS-922, and RS-759 (manufacturer: DIC), but are not limited thereto.

The silicon-based additive may include two or more different silicon-based additives, and more specifically, may include two or more different polyether-modified polysiloxane copolymers having different weight average molecular weights. In this case, a difference in the weight average molecular weight between the two or more different polyether-modified polysiloxane copolymers having different weight average molecular weights may be 50 or more.

When the silicon-based additive includes two or more polyether-modified polysiloxane copolymers having different weight average molecular weights, the polyether-modified polysiloxane copolymer having a relatively high weight average molecular weight may float to the surface to provides slip properties and surface levelling, while the polyether-modified polysiloxane copolymer having a relatively low weight average molecular weight may improve wetting and flowability between the organic or inorganic fine particles dispersed on the binder and minimize the phenomenon of them floating to the surface.

Accordingly, when the antiglare layer is formed, the flow of the organic or inorganic fine particles may be smooth while preventing a phenomenon such as the particles floating to the surface thereof or aggregation therein, and accordingly, it is possible to prevent the phenomenon of the above-described pressed portions appearing due to occurrence of a large number of aggregations of the particles.

As described above, the binder resin contained in the antiglare layer may include a photocurable resin. The photocurable resin means a (co)polymer of a photopolymerizable compound that may cause a polymerization reaction when irradiated with light such as ultraviolet rays.

Specific examples of the photopolymerizable compound include a (co)polymer formed from a vinyl-based monomer or oligomer or a (meth)acrylate monomer or oligomer.

Examples of the photocurable resin may include a polymer or copolymer formed from a reactive acrylate oligomer group consisting of urethane acrylate oligomer, epoxide acrylate oligomer, polyester acrylate, and polyether acrylate; and a group consisting of a polyfunctional acrylate monomer including dipentaerythritol hexaacrylate, dipentaerythritol pentaacrylate, pentaerythritol tetraacrylate, pentaerythritol triacrylate, trimethylolpropane triacrylate, glycerin propoxylate triacrylate, trimethylpropane ethoxylate triacrylate, trimethylpropyl triacrylate, 1,6-hexanediol diacrylate, tripropylene glycol diacrylate, and ethylene glycol diacrylate, or an epoxy resin including an epoxy group, alicyclic epoxy group, glycidyl group, epoxy group, or epoxy group containing an oxetane group.

The binder resin may further include a (co)polymer (hereinafter referred to as high molecular weight (co)polymer) having a weight average molecular weight of 10,000 g/mol or more together with the above-mentioned photocurable resin. The high molecular weight (co)polymer may include, for example, one or more polymers selected from the group consisting of a cellulose-based polymer, an acrylic-based polymer, a styrene-based polymer, an epoxide-based polymer, a nylon-based polymer, a urethane-based polymer and a polyolefin-based polymer.

Meanwhile, the polymer substrate may have a thickness of 10 to 150 μm, 20 to 120 μm, or 30 to 100 μm. When the thickness of the polymer substrate is less than 10 μm, the flexibility is reduced and it may be difficult to control the process. In addition, when the polymer substrate is excessively thick, the transmittance of the polymer substrate is reduced, the optical characteristics may be reduced, and it is difficult to make an image display device including the same thinner.

The antiglare layer may have a thickness of 1 to 10 μm. When the thickness of the antiglare layer is too thin, the hardness of the film becomes low, or the scratch resistance is lowered, which makes the film unsuitable for use as the outermost film of an optical laminate. When the thickness of the antiglare layer is too thick, warpage may occur in the film, the bending properties are deteriorated, and the film may be easily broken, thereby making it difficult to run the film during the roll process.

Meanwhile, the ratio of the thickness of the antiglare layer to the thickness of the polymer substrate may be 0.008 to 0.8, or 0.01 to 0.5. When the ratio of the thickness of the antiglare layer to the thickness of the polymer substrate is too small, the antiglare layer does not sufficiently protect the surface of the substrate and thus it may be difficult to secure mechanical properties such as pencil hardness. In addition, when the ratio of the thickness of the antiglare layer to the thickness of the polymer substrate is too large, the flexibility of the laminate is reduced and the crack resistance may be insufficient.

Specific components of the polymer substrate are not particularly limited, but in order to secure moisture resistance together with a predetermined light transmittance, the polymer resin may include one or more selected from the group consisting of a (meth)acrylate resin, a cellulose resin, a polyolefin resin, and a polyester resin.

In the antiglare film laminate, the moisture permeation amount of the polymer substrate measured for 24 hours under the conditions of 40° C. and 100% humidity may be 150 g/m$^2$ or less, or 100 g/m$^2$ or less, or 75 g/m$^2$ or less, or 5 to 75 g/m$^2$.

More specifically, the polymer substrate may have a moisture permeation amount of 150 g/m$^2$ or less, 100 g/m$^2$ or less, or 75 g/m$^2$ or less, or 5 to 75 g/m$^2$, when the moisture permeation amount is measured for 24 hours under the conditions of 40° C. and 100% humidity (measurement equipment: Labthink Instruments Co., Ltd.'s Water Vapor Permeability Tester).

Meanwhile, the antiglare layer may include 1 to 10 parts by weight, 2 to 8 parts by weight, or 3 to 6 parts by weight of the organic fine particles based on 100 parts by weight of the binder resin.

In addition, the antiglare layer may include 0.1 to 5 parts by weight, 0.2 to 4 parts by weight, 0.3 to 3 parts, or 0.5 to 1 parts by weight of the inorganic fine particles based on 100 parts by weight of the binder resin.

When the content of the organic fine particles or the inorganic fine particles in the antiglare layer is too small compared to the binder resin, the scattering/reflection of external light is not properly controlled, and thus the antiglare property may be greatly deteriorated, and further, the stability of the particles at the time of drying is sharply reduced and protrusions of several hundred μm in size may be formed, thus making it difficult to secure optical properties.

In addition, when the content of the rubber particles in the polymer substrate is too high relative to the binder resin, the refraction of the transmitted image light may be increased and the image sharpness of the optical film may be greatly deteriorated, and many overlapped particles may be generated so that fine protrusions increase, white turbidity occurs, or the black sharpness of the film decreases.

The particle diameter of the organic or inorganic fine particles is not particularly limited.

The organic fine particles contained in the antiglare layer may be a micron (μm) scale, and the inorganic fine particles contained in the antiglare layer may be a nano (nm) scale. In the present specification, the micron (μm) scale refers to having a particle size or a particle diameter of less than 1 mm, i.e., less than 1000 μm, the nano (nm) scale refers to having a particle size or a particle diameter of less than 1 μm, i.e., less than 1000 nm, and a sub-micron (sub-μm) scale refers to having a particle size or a particle diameter of a micron scale or nano scale.

More specifically, the organic fine particles may have a cross-sectional diameter of 1 to 50 μm, or 1 to 10 μm. In addition, the inorganic fine particles may have a cross-sectional diameter of 1 nm to 500 nm, or 1 nm to 300 nm.

Specific examples of the organic or inorganic fine particles contained in the hard coating layer are not limited, but for example, the organic or inorganic fine particles may be organic fine particles composed of an acrylic-based resin, a styrene-based resin, an epoxide resin, and a nylon resin, or inorganic fine particles composed of a silicon oxide, a titanium dioxide, an indium oxide, a tin oxide, a zirconium oxide, and a zinc oxide.

Meanwhile, the antiglare film laminate includes the antiglare layer containing the binder resin and the organic or inorganic fine particles, the number of pressed portions formed on the outer surface of the antiglare layer is 0.001 pieces/m$^2$ or less, and it has a relatively low arithmetic mean roughness (Ra), so that it may have uniform and smooth surface properties.

This is because, as the organic fine particles and/or the inorganic fine particles are uniformly distributed in the antiglare layer, a phenomenon in which the surface becomes non-uniform or increases in surface roughness due to aggregation or the like is prevented.

An optical film including a previously known antiglare layer used organic particles and inorganic nanoparticles together to form protrusions and depressions on a surface thereof and secured antiglare characteristics through this. However, the antiglare film laminate may realize antiglare characteristics while having a relatively low arithmetic mean roughness (Ra), and as described above, high scratch resistance and high image sharpness may also be secured.

More specifically, the arithmetic average roughness (Ra) measured on the surface of the antiglare layer may be 200 nm or less, 100 nm or less, or 10 nm to 100 nm, or 50 nm to 98 nm, or 60 nm to 96 nm.

The arithmetic average roughness (Ra) may be obtained by a measurement device or a known measurement standard (JIS, ISO, etc.). In addition, the arithmetic mean roughness (Ra) may be obtained by measuring an area area of 310 μm×230 μm at two or more places arbitrarily selected on the surface of the antiglare layer, and may be obtained from the result of measuring the arithmetic mean roughness (Ra) by measuring an area area of 310 μm×230 μm at six or more places arbitrarily selected on the surface of the antiglare layer and repeating these 10 times, as will be described later.

In addition, when the antiglare film laminate has the above-described arithmetic average roughness (Ra) and realizes a level of haze at which antiglare properties may be realized, high scratch resistance and high image sharpness may be secured.

For the arithmetic average roughness (Ra) measured on the surface of the antiglare layer, a contact type of roughness meter or a non-contact type of roughness meter (for example, a 3D optical surface profiler and the like) may be used, and specifically, a device such as Nanosystem's Optical profiler system NV-2700 may be used.

The standard for measuring the arithmetic mean roughness (Ra) measured on the surface of the antiglare layer may follow JIS B 0601-2001 in the case of the contact-type of roughness meter, and may follow the standard (for example, ISO 25178) adopted by the used device in the case of the non-contact of roughness meter.

Meanwhile, the antiglare film laminate of the embodiment may further include a low refractive index layer formed on one surface of the antiglare layer and having a refractive index of 1.20 to 1.60 in the wavelength region of 380 nm to 780 nm.

The low refractive index layer having a refractive index of 1.20 to 1.60 in the wavelength region of 380 nm to 780 nm may include a binder resin and organic fine particles or inorganic fine particles dispersed in the binder resin, and optionally, it may further include a fluorine-containing compound having a photoreactive functional group and/or a silicon-based compound having a photoreactive functional group.

The binder resin contains a (co)polymer containing a polyfunctional (meth)acrylate repeating unit, and such repeating unit may be derived, for example, from a polyfunctional (meth)acrylate compound such as trimethylolpropane triacrylate (TMPTA), trimethylolpropaneethoxy triacrylate (TMPEOTA), glycerin propoxylated triacrylate (GPTA), pentaerythritol tetraacrylate (PETA), or dipentaerythritol hexaacrylate (DPHA).

The photoreactive functional group contained in the fluorine-containing compound or silicon-based compound may include one or more functional groups selected from the group consisting of (meth)acrylate group, epoxide group, vinyl group, and thiol group.

The fluorine-containing compound containing the photoreactive functional group may be one or more compounds selected from the group consisting of i) an aliphatic compound or an aliphatic cyclic compound in which at least one photoreactive functional group is substituted and at least one fluorine is substituted for at least one carbon; ii) a heteroaliphatic compound or heteroaliphatic cyclic compound in which at least one photoreactive functional group is substituted, at least one hydrogen is substituted with fluorine and at least one carbon is substituted with silicon; iii) a polydialkylsiloxane-based polymer in which at least one photoreactive functional group is substituted and at least one fluorine is substituted for at least one silicon; and iv) a polyether compound in which at least one photoreactive functional group is substituted and at least one hydrogen is substituted with fluorine.

The low refractive index layer may include hollow inorganic nanoparticles, solid inorganic nanoparticles, and/or porous inorganic nanoparticles.

The hollow inorganic nanoparticles refer to particles having a maximum diameter of less than 200 nm and having a void space on the surface and/or inside thereof. The hollow inorganic nanoparticles may include one or more selected from the group consisting of inorganic fine particles having a number average particle diameter of 1 to 200 nm, or 10 to 100 nm. Further, the hollow inorganic nanoparticles may have a density of 1.50 g/cm$^3$ to 3.50 g/cm$^3$.

The hollow inorganic nanoparticles may contain one or more reactive functional groups selected from the group consisting of a (meth)acrylate group, an epoxide group, a vinyl group, and a thiol group on the surface. By containing the above-mentioned reactive functional group on the surface of the hollow inorganic nanoparticles, it may have a higher degree of crosslinking.

The solid inorganic nanoparticles may include one or more selected from the group consisting of solid inorganic fine particles having a number average particle diameter of 0.5 to 100 nm.

The porous inorganic nanoparticles may include one or more selected from the group consisting of inorganic fine particles having a number average particle diameter of 0.5 to 100 nm.

The low refractive index layer may include 10 to 400 parts by weight of the inorganic nanoparticles; and 20 to 300 parts by weight of a fluorine-containing compound and/or a silicon-based compound including the photoreactive functional group based on 100 parts by weight of the (co) polymer.

Meanwhile, according to another embodiment of the invention, a polarizing plate including the antiglare film laminate may be provided.

The polarizing plate may include the antiglare film laminate as a polarizer protective film. Accordingly, the polarizing plate may include a polarizer, and the antiglare film laminate formed on one surface of the polarizer, and a second polarizer protective film formed on the other surface of the polarizer to face the antiglare film laminate.

The second polarizer protective film may be a polymer substrate included in the antiglare film laminate, an ester resin film such as PET, a cellulose-based film such as TAC, an acryl-based film, a COP film, and the like.

The polarizing plate of the embodiment includes a polarizer. As the polarizer, a polarizer well known in the art, for example, a film composed of polyvinyl alcohol (PVA) containing iodine or dichroic dyes may be used. In this case, the polarizer may be manufactured by dying iodine or dichromatic dyes on the polyvinyl alcohol film and stretching the film, but the manufacturing method thereof is not particularly limited.

Meanwhile, when the polarizer is a polyvinyl alcohol film, the polyvinyl alcohol film may be used without particular limitation as long as it contains a polyvinyl alcohol resin or a derivative thereof. In this case, examples of the derivative of the polyvinyl alcohol resin include, but are not limited to, polyvinyl formal resin, polyvinyl acetal resin, and the like. Alternatively, the polyvinyl alcohol film may be a commercially available polyvinyl alcohol film generally used for the production of polarizers in the art, for example, P30, PE30, or PE60 manufactured by Kuraray, M3000, or M6000 manufactured by Nippon Synthetic Chemical Industry Co., Ltd., or the like.

Meanwhile, the polyvinyl alcohol may have a degree of polymerization of 1,000 to 10,000, or 1,500 to 5,000, without being limited thereto. When the degree of polymerization satisfies this range, molecules may move freely and may be smoothly combined with iodine, a dichroic dye, or the like. Further, the polarizer may have a thickness of 40 μm or less, 30 μm or less, 20 μm or less, 1 to 20 μm, or 1 μm to 10 μm. In this case, devices, such as a polarizing plate and an image display device containing the polarizer may be made thinner and lighter.

The polarizing plate may further include an adhesive layer which is located between the polarizer and the polymer substrate of the optical laminate and which has a thickness of 0.1 μm to 5 μm.

In the adhesive layer, various polarizing plate adhesives used in the art, for example, polyvinyl alcohol-based adhesives, polyurethane-based adhesives, acrylic-based adhesives, cationic-based or radical-based adhesives and the like may be used as the adhesive without limitation.

According to the other embodiment of the present invention, there may be provided a display device including the above-described optical laminate or polarizing plate.

Specific examples of the display device are not limited, and may be, for example, a device such as a liquid crystal display, a plasma display device, or an organic light emitting diode device.

As one example, the display device may be a liquid crystal display device including a pair of polarizing plates facing each other; a thin film transistor, a color filter, and a liquid crystal cell sequentially stacked between the pair of polarizing plates; and a backlight unit.

In the display device, the optical laminate or the polarizing plate may be provided on the outermost surface of a display panel facing an observer or on the outermost surface thereof facing a backlight.

In another example, the display device may include a display panel; and a polarizing plate disposed on at least one surface of the display panel.

The display device may be a liquid crystal display device including a liquid crystal panel and an optical laminate provided on both surfaces of the liquid crystal panel, wherein at least one of the polarizing plates may be a polarizing plate including a polarizer according to one embodiment of the present disclosure.

In this case, the type of liquid crystal panel included in the liquid crystal display device is not particularly limited, but for example, a known panel such as a passive matrix-type panel such as a twisted nematic (TN), super twisted nematic (STN), ferroelectric (F) or polymer dispersed (PD) panel, an active matrix-type panel such as a two or three terminal panel, an in-plane switching (IPS) panel or a vertical alignment (VA) panel may be used.

Advantageous Effects

According to embodiments of the present invention, an antiglare film laminate which realizes a high contrast ratio and excellent image sharpness and has mechanical properties such as high wear resistance and scratch resistance, a polarizing plate including the antiglare film laminate, and a liquid crystal panel and a display device including the polarizing plate may be provided.

BRIEF DESCRIPTION OF THE DRAWINGS

FIG. 1 illustrates an electron microscope photograph (100 times) confirming a shape of pressed portions found on a surface of an antiglare film laminate of Comparative Example 1.

FIG. 2 illustrates a planar analysis result of a pressed portion existing on a surface of an antiglare film laminate of Comparative Example 1 by using the Optical Profiler NewView 7300 equipment.

FIG. 3 illustrates a cross-sectional analysis result of a pressed portion existing on a surface of an antiglare film laminate of Comparative Example 1 by using the Optical Profiler NewView 7300 equipment.

The invention will be described in more detail with reference to examples below. However, the following examples are only to illustrate the present invention, the present invention is not limited to the following examples.

Examples 1 to 3 and Comparative Examples 1 to 3: Preparation of Antiglare Film Laminate (1) Preparation of Coating Composition for Forming Antiglare Layer The components shown in Table 1 below were mixed to prepare a coating composition for forming an antiglare layer.

TABLE 1

| Unit (g) | | Example 1 | Example 2 | Comparative Example 1 | Comparative Example 2 | Comparative Example 3 | Comparative Example 4 |
|---|---|---|---|---|---|---|---|
| Binder (total 27.6 g) | TMPTA | 13.8 | 13.8 | 13.8 | 13.8 | 13.8 | 13.8 |
| | PETA | 6.9 | 6.9 | 6.9 | 6.9 | 6.9 | 6.9 |
| | EB220 | 6.9 | 6.9 | 6.9 | 6.9 | 6.9 | 6.9 |
| Initiator | I-184 | 1.7 | 1.7 | 1.7 | 1.7 | 1.7 | 1.7 |
| Organic fine particle | XX-103BQ | 1.3 | 1.3 | 1.3 | 1.3 | 1.3 | 1.3 |
| Inorganic fine particle | MA-ST | 0.2 | 0.2 | 0.2 | 0.2 | 0.2 | 0.2 |
| Fluorine-based additive | T440 | 0.015 | 0.015 | 0.015 | 0.015 | 0.015 | — |
| | T270 | 0.06 | 0.06 | 0.06 | 0.06 | 0.06 | 0.06 |
| Silicon-based additive | F444 | 0.122 | 0.195 | 0.024 | 0.061 | 0.061 | 0.122 |
| Solvent | IPA | — | — | — | — | 40 | — |
| | n-BuOH | 10 | 20 | 10 | 10 | 30 | 10 |
| | MIBK | 50 | 30 | 50 | 50 | — | 50 |
| | n-BA | 10 | 20 | 10 | 10 | — | 10 |
| Coating thickness (μm) | | 4 | 4 | 4 | 4 | 4 | 4 |
| Number of pressed portions [pcs/m$^2$] | | 0 | 0 | 0.381 | 0.022 | 0.010 | — |

TMPTA: trimethylolpropane triacrylate

PETA: pentaerythritol triacrylate

EB220: 6-functional polyurethane acrylate oligomer (manufactured by SK Cytec)

I-184: initiator (Irgacure 184, manufactured by Ciba)

Organic fine particle: XX-103BQ (2.0 μm 1.515), copolymer particle of polystyrene and polymethylmethacrylate (manufactured by Sekisui Plastic)

MA-ST (30% in MeOH): disperse solution in which nano-silica particles with a size 10-15 nm are dispersed in methanol (manufactured by Nissan Chemical)

T440: TEGO ® Glide 440 polyether-modified polysiloxane (manufactured by Tego Evonik)

T270: TEGO ® Glide 270 polyether-modified polysiloxane (manufactured by Tego Evonik)

F444: Megapack F444 (manufactured by DIC Corporation: perfluoroalkylethyleneoxide additive: liquid at room temperature and atmospheric pressure)

IPA: isopropyl alcohol n-BuOH: n-butanol

MIBK: methylisobutyl ketone n-BA: n-butyl acetate (2) Preparation of Antiglare Film Laminate Each of the above-prepared coating solutions for forming the antiglare layer was coated onto PET film (manufactured by TOYOBO: thickness 80 μm) by #12 mayer bar, and then dried at a temperature of 40° C. for 2 minutes, followed by UV curing to form an antiglare layer (coating thickness of 4 μm). When UV curing, the UV lamp used a H bulb, the curing reaction was carried out under a nitrogen atmosphere, and the amount of UV light irradiated during curing was 150 mJ/cm$^2$.

(3) Confirmation of the Number of Pressed Portions Formed on Outer Surface of Antiglare Layer The surface of the antiglare film laminate obtained in each of the examples and the comparative examples was monitored by using an automatic inspection machine (product name: boundary transmission automatic inspection machine/manufacturer: Next Eye) and a charge-coupled device (CCD) camera. In this case, a reflection mode and a transmission mode on the surface of the antiglare film laminate were combined and recorded by dividing it into white dots and black dots, and in the case of pressing, it was marked as the black dot.

In addition, under a low speed of 5 to 10 m/min, all surfaces were irradiated under three wavelengths and visually inspected, so that an area having a diameter of 200 μm to 600 μm in the antiglare layer and having a thickness of 80% or less of the average thickness of the antiglare layer was designated as the pressed portion.

In addition, as illustrated in FIG. 2 and FIG. 3, by using the Optical Profiler NewView 7300 equipment, planar and cross-sectional analysis of the pressed portion existing on the surface of the antiglare film laminate was performed.

Experimental Example: Measurement of Physical Properties of Antiglare Film Laminates 1. Haze Evaluation of Antiglare Film Laminate A 4 cm×4 cm specimen was prepared from the antiglare film laminate obtained from each of the examples and the comparative examples, measurement was performed three times with a haze meter (HM-150, A light source, manufactured by Murakami Color Research Laboratory) and the average value was calculated, and this was calculated as a total haze value. In the measurement, the light transmittance and the haze were simultaneously measured, and the light transmittance was measured according to JIS K 7361 standard and the haze was measured according to JIS K 7136 standard.

2. Element Content Analysis in Antiglare Film Laminate

For the antiglare film laminate obtained from each of the examples and the comparative examples, the contents (the contents measured by obtaining the area of each peak from the narrow scan data of the identified components) of fluorine (F), carbon (C), and silicon (Si) were measured by obtaining a survey and narrow scan spectrum in the constant analyzer energy (CAE) mode by using the XPS device (model name: K-Alpha Thermo Fisher Scientific).

3. Measurement of Arithmetic Mean Roughness (Ra) of Antiglare Film Laminate

For the antiglare film laminate obtained from each of the examples and comparative examples, the arithmetic mean roughness (Ra) was obtained by measuring the surface shape and roughness at 6 or more positions in the 310 μm×230 μm area in the white scanning interferometer (WSI) mode by using Nanosystem's Optical profiler system NV-2700 and repeating these 10 times [measurement reference follows that employed by the NV-2700].

4. Measurement of Scratch Resistance

Using a scratch-resistant measuring device (KPD-301, Kipae E & T), the surface of the optical laminate obtained in each of the examples and the comparative examples was rubbed back and forth 10 times with a steel wool (#0000) under a load at a speed of 27 rpm within a section of 2.5 cm in width and 13 cm in length. The maximum load at which one or less scratch of 1 cm or less observed with the naked eye was observed was measured.

TABLE 2

| Result of experimental example | | | | | | |
|---|---|---|---|---|---|---|
| | Example 1 | Example 2 | Comparative Example 1 | Comparative Example 2 | Comparative Example 3 | Comparative Example 4 |
| fluorine (F) and silicon (Si)/all elements [weight ratio, %] | 13 | 19 | 6 | 10 | 10 | — |
| fluorine (F)/carbon (C) [weight ratio, %] | 16 | 23 | 3 | 10 | 7 | — |
| silicon (Si)/carbon (C) [weight ratio, %] | 5 | 10 | 6 | 5 | 8 | — |
| fluorine (F) + silicon (Si)/carbon (C) [weight ratio, %] | 21 | 33 | 9 | 15 | 16 | — |
| weight ratio between fluorine (F)/carbon (C) elements in pressed portion [weight ratio, %] | No press | No press | 2 | — | 2.3 | — |
| Arithmetic average roughness (Ra) [nm] | 95 | 62 | 104 | 68 | 54 | — |
| Haze (%) | 1 | 1.1 | 1 | 1.0 | 0.8 | — |
| Coating property | Good | Good | Good | Good | Partial dewetting occurrence | Dewetting occurrence |
| Scratch resistance | 700 gf | 700 gf | 400 gf | 500 gf | 400 gf | — |
| Number of press defects (ea/$m^2$) | 0 | 0 | 0.38 | 0.02 | 0.01 | |

As shown in the Table 2, it was confirmed that the pressed portion having a diameter of 200 μm to 600 μm and a thickness of 80% or less of the average thickness of the antiglare layer was not substantially formed on the surface of the antiglare film laminate of the examples. In addition, it was confirmed that the antiglare film laminate of these examples realized a level of haze and high image sharpness at which antiglare properties could be realized while having high scratch resistance.

On the contrary, it was confirmed that, in the antiglare film laminate of the comparative examples, more than 0.01 pieces/$m^2$ of the pressed portions having a diameter of 200 μm to 600 μm and a thickness of 80% or less of the average thickness of the antiglare layer appeared, and it was confirmed that the antiglare film laminate of these comparative examples exhibited a low level of scratch resistance or relatively low image sharpness.

What is claimed is:

1. An antiglare film laminate, comprising:

a polymer substrate; and an antiglare layer comprising a binder resin, a silicon-based additive, a fluorine-based additive, and organic fine particles and inorganic fine particles dispersed on the binder resin, wherein the number of pressed portions formed on an outer surface of the antiglare layer is 0.001 pieces/$m^2$, each pressed portion has a diameter of 200 μm to 600 μm and a thickness of 80% or less of an average thickness of the antiglare layer, the antiglare layer has a thickness of 1 to 10 μm, the antiglare layer comprises 0.3 parts by weight or more of the fluorine-based additive and 0.25 parts by weight or more of the silicon-based additive based on 100 parts by weight of the binder resin, the antiglare layer comprises 1 to 10 parts by weight of the organic fine particles and 0.1 to 5 parts by weight of the inorganic fine particles based on 100 parts by weight of the binder resin, a weight ratio of fluorine (F)/carbon (C) element on a surface of the antiglare layer excluding the pressed portion(s) is 10% or more, a weight ratio of silicon (Si)/carbon (C) element on the surface of the antiglare layer excluding the pressed portion(s) is 5 to 15%, and on the surface of the antiglare layer excluding the pressed portion(s), a weight ratio of a total of the fluorine (F) and silicon (Si) elements/carbon (C) element is 20 to 35%, wherein: the polymer substrate has a thickness of 10 to 150 μm, wherein: an arithmetic average roughness (Ra) measured on the surface of the antiglare layer is 100 nm or less, wherein: a weight ratio of fluorine (F)/carbon (C) element in the pressed portion is 3.0% or less.

2. The antiglare film laminate of claim 1, wherein: a ratio of the thickness of the antiglare layer to the thickness of the polymer substrate is 0.008 to 0.8.

3. The antiglare film laminate of claim 1, wherein: the binder resin included in the antiglare layer comprises a (co) polymer formed from a vinyl-based monomer or oligomer, or a (meth)acrylate monomer or oligomer.

4. The antiglare film laminate of claim 1, wherein the binder resin contained in the antiglare layer comprises a photocurable resin, and the photopolymerizable compound includes a (co) polymer formed from a vinyl-based monomer or oligomer or a (meth)acrylate monomer or oligomer.

5. The antiglare film laminate of claim 1, wherein: the silicon-based additive comprises polyether-modified polysiloxane copolymer or two or more polyether-modified polysiloxane copolymers having different weight average molecular weights and the fluorine-based additive comprises a fluorine-based copolymer or a copolymer of a fluorine-based and silicon-based mixture.

6. The antiglare film laminate of claim 1, wherein: the organic fine particles included in the antiglare layer have a cross-sectional diameter of 1 to 50 μm, and the inorganic fine particles included in the antiglare layer have a cross-sectional diameter of 1 nm to 500 nm.

7. A polarizing plate comprising the antiglare film laminate of claim 1.

8. A display device comprising the polarizing plate of claim 7.

* * * * *